Figure 1:
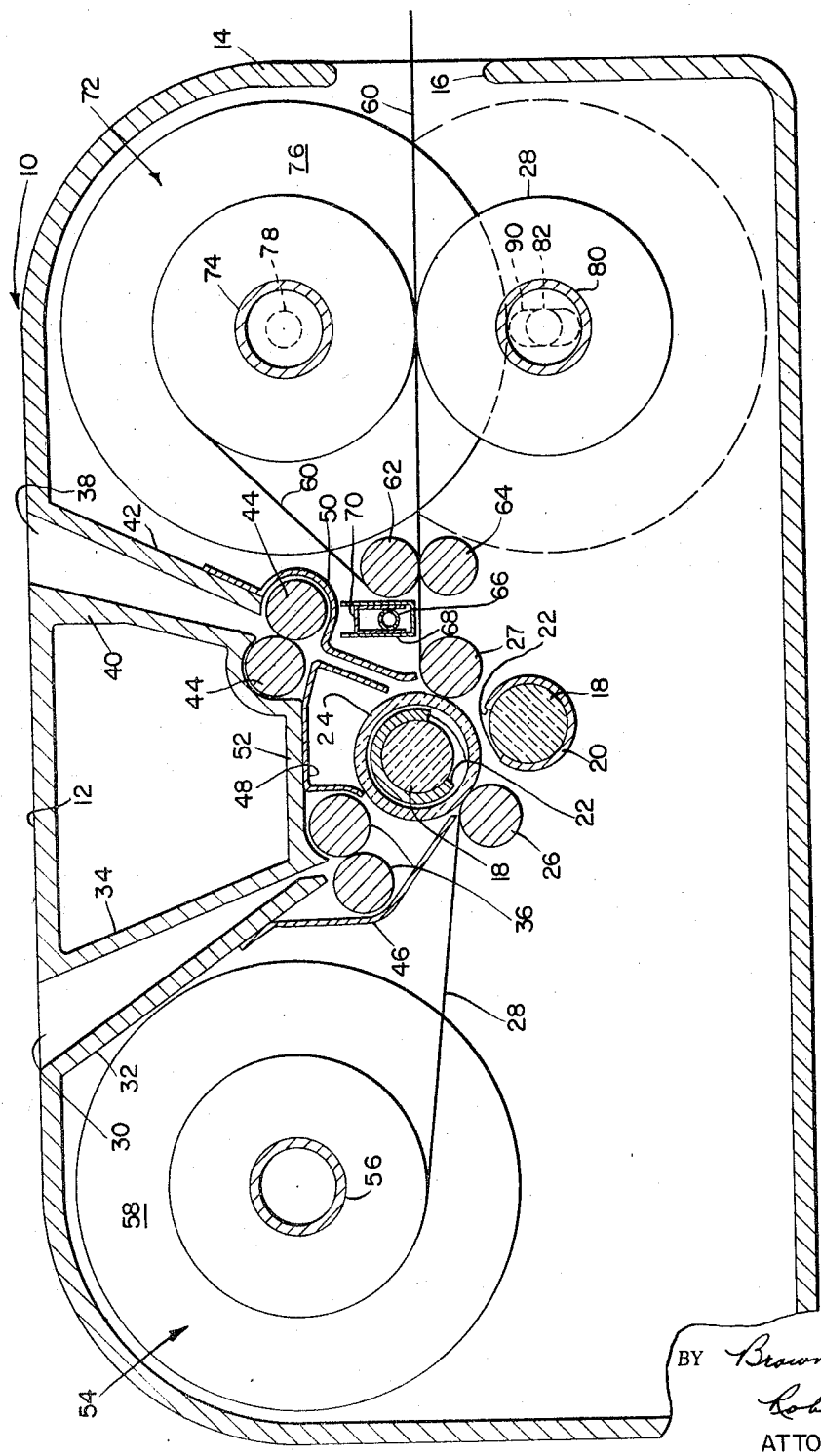

Feb. 14, 1967    E. H. LAND ETAL    3,303,768
PHOTOGRAPHIC APPARATUS
Filed May 25, 1966    2 Sheets-Sheet 1

Edwin H. Land
and
Arthur J. Sable
INVENTORS

BY Brown and Mikulka
and
Robert E. Corb
ATTORNEYS

United States Patent Office 3,303,768
Patented Feb. 14, 1967

3,303,768
PHOTOGRAPHIC APPARATUS
Edwin H. Land, Cambridge, Mass., and Arthur J. Sable, Riverside, Conn., assignors to Polaroid Corporation, Cambridge, Mass., a corporation of Delaware
Filed May 25, 1966, Ser. No. 563,620
2 Claims. (Cl. 95—89)

This application is a continuation-in-part of copending application Serial No. 493,864, filed October 7, 1965, in turn, a continuation of application Serial No. 343,918, filed February 6, 1964, in turn, a continuation of application Serial No. 159,176, filed December 13, 1961 (now abandoned).

This invention relates to photographic apparatus and, more particularly, to improvements in apparatus of the type in which elongated sheets are advanced from storage, processed and then advanced into storage.

Photographic apparatus of the type in which the present invention is incorporated may take a number of different forms including cameras and similar devices for exposing and/or processing exposed photosensitive sheet material. Apparatus of this type also includes document copying devices such as is shown and described hereinafter in which a photosensitive sheet is withdrawn from storage (where it is coiled upon a spool), is exposed, is advanced into superposition with a second sheet, is processed by a fluid distributed between the superposed sheets and is then separated from the photosensitive sheet and advanced into storage (on another spool). The apparatus and the materials in the preferred embodiment are designed to produce a positive copy, by a diffusion transfer-reversal process, carried on the second sheet which is withdrawn from the apparatus.

Objects of the invention are: to provide in photographic apparatus of the type described, a rotatable sheet supply spool and a rotatable sheet take-up spool which coact with one another to uncoil a sheet from the supply spool while coiling a sheet on the take-up spool, the latter being rotated to effect the advancement of one or more sheets through the apparatus during treatment of the sheets; to provide apparatus as described in which only one of the spools includes sheet-aligning disks at its end and both spools include spindles, around which the sheets are coiled, mounted in juxtaposition with their axes of rotation substantially in a plane and biased toward one another so that the disks on one spool cooperate with the spindle of the other spool to align convolutions of the sheet coiled thereon; to provide apparatus as described in which the spool with the aligning disks is mounted in fixed position and the spindle of the other spool is mounted for movement toward and away from the first-mentioned spool; and to provide apparatus as described in which rotary motion can be imparted to either or both of the spindles.

Other objects of the invention are: to provide photographic apparatus of the foregoing type in which the cooperating spools function to supply and take up the same sheet; to provide apparatus as described in which the spools supply and take up different sheets superposed with one another during processing; and to provide apparatus of this type in which the supply and take-up spools function to separate a pair of juxtaposed sheets one of which is coiled on the supply spool prior to superpositioning.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

Figure 2:
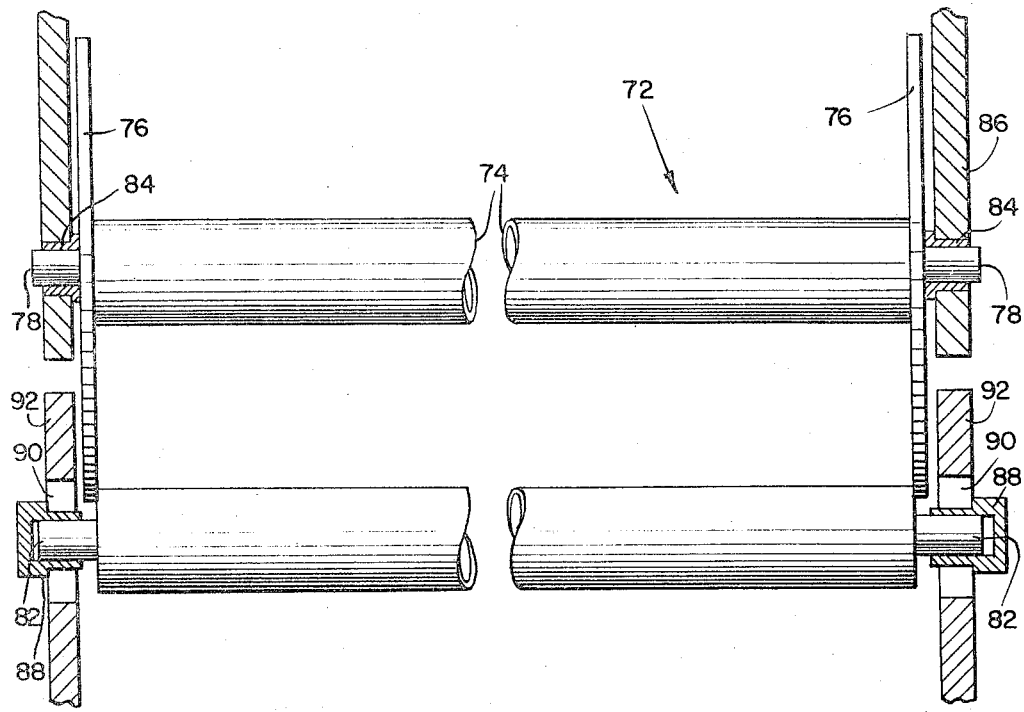

For a fuller understanding of the nature and objects of the invention, reference should be had to the following detailed description taken in connection with the accompanying drawings wherein:

FIGURE 1 is a somewhat diagrammatic sectional view of photographic apparatus in the form of a document copying device incorporating the invention; and FIG. 2 is a fragmentary sectional view taken along the line 2—2 of FIGURE 1 illustrating the invention.

Reference is now made to FIGURE 1 of the drawings wherein there is illustrated the basic sheet-handling components of document copying apparatus embodying the invention. This apparatus is of the type shown and described in detail in the copending U.S. patent application of Edwin H. Land, Serial No. 133,483, filed August 23, 1961, now Patent No. 3,165,046, issued January 12, 1965. The apparatus comprises a housing 10 for mounting and enclosing the components of the apparatus. Housing 10 includes an upper wall 12 having a pair of openings therein through which original documents to be copied are introduced and withdrawn; and an end wall 14 having a withdrawal opening 16 through which copies produced in the apparatus are withdrawn.

The apparatus includes means for exposing a photosensitive image-recording sheet material in conjunction with an original document to produce an image of the document during movement of the document and photosensitive sheet through the apparatus. This exposure means, in the form shown, comprises two sources of illumination and means for advancing a photosensitive sheet along a predetermined path between the two sources. The sources of illumination are elongated and extend transversely of the direction of movement of the photosensitive sheet and may comprise, for example, tubular fluorescent lamps or elongated electro-luminescent panels. In the form shown, the sources of illumination comprise elongated cylindrical light-conducting bars or rods 18, formed of a light-conducting material, many of the organic plastics including the acrylic resins being suited to this function. A lamp (not shown) is provided at one end of each of the bars for emitting light to be conducted by each of the bars, the latter including a roughened or scratched area extending axially along the peripheral surface of each bar for reflecting light transmitted by the bar so that the light is omitted from a portion of the peripheral surface of the bar lying diametrically opposite the roughened portion of the surface of the bar. Each of bars 18 is disposed within a cylindrical tube 20 formed of a light opaque material and having an axial slot 22 through which light is transmitted for exposing the photosensitive sheet. For details of the light sources, reference may be had to U.S. patent application Serial No. 133,399, filed August 23, 1961, in the names of Gold et al., now Patent No. 3,139,018, issued June 30, 1964.

As a means for conducting the photosensitive sheet past and between the two light sources, one of bars 18 and its surrounding tube 20 is enclosed in a support tube 24 formed of a light-transmitting material and having an inside diameter which is greater than the outside diameter of tube 20, so that tube 24 is free to rotate about 20. The photosensitive sheet is supported against tube 24 during exposure by a pair of support rolls 26 and 27 located adjacent support tube 24 and spaced from one another around a portion of the peripheral surface of tube 24.

The original document to be copied is superposed with a portion of the photosensitive sheet during exposure of that portion of the photosensitive sheet. Exposure of the photosensitive sheet can be of two types, either "direct," in which light is transmitted through the original to the photosensitive sheet; or "reflex," in which light is transmitted through the photosensitive sheet to the original and then reflected from the areas of the original to cause a differential exposure in the photosensitive sheet. The original is introduced into the apparatus between the photosensitive sheet, herein designated 28, and support tube 24; and the two sources of illumination can be utilized alternatively to effect either direct or reflex type exposures. In order to permit introduction and withdrawal of an original, the upper wall of the housing is provided with an inlet passage 30 defined by two converging guide walls 32 and 34 which extend inwardly from upper wall 12 toward the bite of support roll 26 and support tube 24. Mounted at the inner end of passage 30 are a pair of juxtaposed feed rolls 36 for closing passage 30 against the admission of light and engaging and feeding an original document from passage 30 between support tube 24 and support roll 26. The original document, following exposure, is withdrawn from the housing of the apparatus through an exit passage 38 defined by divergent guide walls 40 and 42. Mounted adjacent the inner end of exit passage 38 is a pair of feed rolls 44 for engaging an original document as it is advanced from between the photosensitive sheet and support tube 24 at the bite of the latter and support roll 27. Feed rolls 44 may be located, as shown, so as to engage one another at a plane tangent to support tube 24 and support roll 27 at the bite of the tube and roll so that the original document tends to feed directly from superposition with the photosensitive sheet into the bite of feed rolls 44. Suitable light-sealing wall elements, designated 46, 48, and 50, are secured respectively to guide wall 32, an inner wall 52 which joins guide walls 34 and 40, and to guide wall 42, for cooperating to help prevent the admission of light into the housing through passages 30 and 38 and also guiding the original document into and from superposition with the photosensitive sheet.

Photosensitive sheet 28 is originally provided coiled on a spool 54, of the usual type including a cylindrical spindle 56 and aligning disks 58, mounted in the upper portion of the housing at the end thereof opposite withdrawal opening 16. The photosensitive sheet comprises a conventional light-sensitive image-recording material carried on a suitable support, for example, a gelatino silver halide emulsion carried on a paper support. Following exposure of the photosensitive sheet, an exposed area thereof is superposed with an area of a second sheet, designated 60, preferably adapted to serve as a support for a print produced from the photosensitive layer by a silver halide diffusion transfer-reversal process. Processing of the photosensitive sheet to produce a print is effected by distributing a processing fluid between an exposed area of the photosensitive sheet and an area of second sheet 60 to form a sandwich which is allowed to imbibe for a predetermined period at the end of which the two sheets can be separated to terminate the processing and allow viewing of the print.

For examples of processes performed by and materials useful in the apparatus of the invention, reference may be had to U.S. Patents Nos. 2,543,181, issued February 27, 1951, and 2,662,882, issued December 15, 1953, both in name of Edwin H. Land.

Distribution of the processing fluid between the superposed photosensitive and second sheets is effected by advancing the sheets relative to and between a pair of juxtaposed pressure-applying members, shown as a pair of rolls 62 and 64, located adjacent support roll 27. The photosensitive sheet is guided from support roll 27 into the bite of pressure-applying rolls 62 and 64 while the second sheet is advanced from a spool on which it is carried, mounted in the upper portion of the housing adjacent withdrawal opening 16, around a portion of pressure-applying roll 62 into superposition with the photosensitive sheet between the pressure-applying rolls.

The processing fluid may be provided for distribution between the photosensitive and second sheets by a number of different means, including rupturable containers mounted on one of the sheets, or some type of continuous fluid-dispensing system which supplies the fluid to the photosensitive sheet at or closely adjacent the bite of the pressure-applying rolls. In the form shown, a quantity of processing fluid is provided for processing each exposed area of the photosensitive sheet in an elongated container, designated 66, and shaped very much like a conventional drinking straw. Container 66 is positioned within the housing adjacent a portion of photosensitive sheet 28 extending between support roll 27 and pressure-applying roll 64, and extends transversely of the direction of movement of the photosensitive sheet. The container is adapted to be withdrawn in the direction of its elongation from the housing across the photosensitive sheet, while the fluid contents of the container are ejected from the trailing end of the container so as to be deposited on the photosensitive sheet in the form of an elongated mass extending from side to side thereof. Ejection of the fluid contents of the container may be effected by a pair of pressure-applying members, designated 68 and 70, for engaging the container adjacent an edge of the photosensitive sheet and compressing the container as the latter is withdrawn across the sheet. Following deposit of the processing fluid on photosensitive sheet 28, the sheet is advanced into superposition with second sheet 60 and the two sheets are moved between pressure-applying rolls 62 and 64 toward opening 16. The pressure-applying rolls distribute the processing fluid between the moving sheets to form a sandwich in which formation of a positive image occurs.

As previously noted, second sheet 60 is supplied coiled on a spool 72 having a cylindrical spindle 74 and a pair of aligning disks 76. Spindle 74 and aligning disks 76 comprise integral portions of spool 72, which also includes stub shafts 78 at its ends on which the spool is rotatably mounted.

The photosensitive and second sheets of the sandwich are separated at the end of a predetermined processing period and the processed photosensitive sheet is advanced into storage which, in the form shown, comprises a spindle 80 on which the photosensitive sheet is coiled. Spindle 80 is approximately equal in length to the distance between disks 76 on spool 72 and includes a pair of stub shafts 82 at its ends at which spindle 80 is mounted for rotation about an axis lying substantially in a plane with the axis of rotation of spool 72. The sandwich comprising photosensitive sheet 28 and second sheet 60 is guided from between rolls 62 and 64 between spindles 74 and 80 and aligning disks 76, and photosensitive sheet 28 is connected to spindle 80 in such a way as to become coiled thereon in response to rotary movement of spindle 80. At the commencement of the processing of a complete supply of the photosensitive and second sheets, spindle 80 is almost empty of the photosensitive sheet, whereas spool 72 is substantially full, that is, the convolutions of the second sheets coiled thereon extend outwardly of the aligning disks 76. At this time the outer convolution of the second sheet coiled on spool 72 engages the second sheet of the sandwich, while spindle 80, or an outer convolution of photosensitive sheet 28 coiled thereon, engages the photosensitive sheet of the sandwich so that the sandwich is engaged between convolutions of the second sheets and spindle 80 which function to guide the sandwich from pressure-applying members 62 and 64 toward opening 16.

As previously noted, the processing period is of a predetermined duration, is initiated by distributing the processing liquid between the sheets at rolls 62 and 64, and is terminated by separation of the sheets at spindles 74 and 80. Since the length of the processing period is the time required for each portion of the sandwich to travel from the pressure rolls to the spindles, it will be obvious that the length of this processing period depends upon the speed of movement of the sandwich and the distance through which the sandwich is moved, that is, the distance from the bite of rolls 62 and 64 where the sheets are superposed to form the sandwich to the line (in a plane through the axes of the spindles) between the spindles at which the sheets are separated. The speed of movement of the sandwich through the apparatus can be controlled, for example, as suggested in the aforementioned Patent No. 3,165,046 by a suitable governor incorporated in the apparatus and coupled with means engaged with one of the sheets and/or the sandwich during movement thereof through the apparatus. Thus, the distance between the pressure-applying rolls and the spindles is determinative of the duration of the processing period, while the spindles themselves perform the function of terminating the processing period.

The apparatus of the invention is illustrated in a condition which would exist when approximately one-half of the original supply of the sheet materials has been advanced through the apparatus. At this time the length of second sheet 60 coiled on spool 72 is approximately equal to the length of photosensitive sheet 28 coiled on spindle 80. Advancement of the sheets through the apparatus may be effected, in the form shown, by engaging a portion of second sheet 60 extending through and from passage 16 and pulling the second sheet from the apparatus. This causes the photosensitive sheet to be advanced from spool 54 between support rolls 26 and 27 and the light sources into superposition with the second sheet at the bite of rolls 62 and 64 and thence onto spindle 80 where the photosensitive sheet is coiled. Advancement of the sheets through the apparatus for exposure and processing can also be effected by imparting a rotary movement to either spool 72 or spindle 80, or to either or both of pressure-applying rolls 62 and 64. As the photosensitive sheet is coiled on spindle 80 and the second sheet is uncoiled from spool 72, aligning disks 76 of spool 72 cooperate with spindle 80 to align the edges of the convolutions of the photosensitive sheet as they are coiled around spindle 80.

It should be noted that when spool 72 is substantially full, as the second sheet is uncoiled from spool 72, the convolutions of the photosensitive sheet being coiled on spindle 80 build up radially at a much faster rate than the radial thickness of the supply of second sheet on spool 72 is reduced. Accordingly, spool 72 and spindle 80, in addition to being biased toward one another, must be movable toward and away from one another in order to accommodate the differences in the rate of change of the thicknesses of the convolutions of the two sheets as the latter are simultaneously withdrawn from one spool and coiled on the other. In the form shown, spool 72 is mounted in fixed position by journaling stub shafts 78 in bushings 84 secured in a support frame 86. Spindle 80 is mounted for movement toward and away from spool 72 by journaling stub shafts 78 in bushings 88 slidably engaged in slots 90 in a support frame 92. Suitable resilient means in the form of springs (not shown) are provided for engaging bushings 88 and biasing spindle 80 toward spool 72. Other means may be provided for movably mounting either or both of spools 72 and spindle 80 including, for example, pivotable arms. Spindle 80 is selected for movable mounting in order to conserve space within the apparatus, since the spindle is not provided with aligning disks, whereas spool 72 includes aligning disks which would require more space if the movement of the spool were to be permitted. Spindle 80 is movable to a position at which a portion of the spindle is located between aligning disks 76 in order to insure that the initial convolutions of the photosensitive sheet are properly aligned when coiled around spindle 80.

In an alternative embodiment of the apparatus, spindle 80 may be located at the opposite end of the housing in juxtaposition with spool 54, in which case, a guide roll would be provided adjacent withdrawal opening 16 for separating the photosensitive sheet from the second sheet and guiding the photosensitive sheet toward spindle 80. In this embodiment, spindle 80 would be mounted in the manner shown and would cooperate with spool 54 in the same manner that it cooperates with spool 72 in the embodiment shown.

The invention has the advantages of compactness which results from eliminating the aligning disks on one spool and the advantages attendant with having components perform more than one function and in such a manner as to permit an operating force to be imparted to the apparatus in any one of a number of different ways. In the operation of the apparatus shown, the operator introduces an original document into inlet passage 30 so that the document is engaged in the bite of feed rolls 36. Feed rolls 36, as well as feed rolls 44, are connected through a suitable transmission to another component of the apparatus which engages and is moved by the sheets, for example, pressure-applying rolls 62 and 64, spool 72 or spindle 80, so that the operator need only pull on the portion of the second sheet 60 projecting through opening 16 to effect the rotation of feed rolls 36 to feed an original into superposition with photosensitive sheet 28 between the latter and support tube 24. Exposure of the photosensitive sheet is made as the photosensitive sheet and superposed original move around the periphery of support tube 24 between support rolls 26 and 27 and the original is automatically fed into the bite of feed rolls 44 which cause the original to be advanced through passage 38 from the housing, as the exposed portion of the photosensitive sheet is processed in conjunction with the second sheet. Only the second sheet containing a copy of the original in the form of a transfer print is withdrawn from the housing, while the waste materials, namely the photosensitive sheet and any processing fluid adhered thereto, is coiled on a spindle within the housing, which spindle may be expendable and may be discarded when the materials with which the device is initially loaded have been expended.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus for exposing and processing an elongated photographic image-recording sheet, in combination, storage means for holding a first image-recording sheet and a second sheet, said storage means including a first rotatable spindle about which said second sheet is coiled; a second spindle mounted for rotation adjacent said first spindle with the axes of rotation of said spindles lying substantially in a plane; means for guiding said sheets from said storage means into superposition with one another, distributing a processing fluid between said superposed sheets to form a sandwich, and advancing said sandwich between said spindles, the last-mentioned means including a pair of juxtaposed pressure-applying members between which said sheets are advanced in superposition to form said sandwich; means for governing the speed of movement of said sandwich through said apparatus; means for biasing said spindles toward one another so that the outer convolutions of sheets coiled on said spindles engage said sandwich therebetween at a predetermined distance from said pressure-applying members; and means for rotating said second spindle to coil said first sheet on said second spindle and separate said first and second sheets comprising said sandwich as said sandwich is advanced between said spindles and said first sheet is coiled on said second spindle.

2. The photographic apparatus of claim 1 comprising a housing for mounting and enclosing the components of said apparatus, said housing including an opening adjacent said spindles through which said second sheet extends from between said spindles so as to be engageable for advancing said sheets through said apparatus and rotating said second spindle.

References Cited by the Examiner

UNITED STATES PATENTS

| 1,083,294 | 1/1914 | Parham | 95—94 |
| 3,165,046 | 1/1965 | Land et al. | 95—89 |

NORTON ANSHER, *Primary Examiner.*